US012230187B2

(12) United States Patent
Lee et al.

(10) Patent No.: US 12,230,187 B2
(45) Date of Patent: Feb. 18, 2025

(54) DISPLAY PANEL AND DISPLAY APPARATUS INCLUDING THE SAME

(71) Applicant: LG Display Co., Ltd., Seoul (KR)

(72) Inventors: Joon Hee Lee, Paju-si (KR); Jong Min Park, Paju-si (KR); Nam Kon Ko, Paju-si (KR); Dong Won Park, Paju-si (KR); Yong Chul Kwon, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/961,323

(22) Filed: Oct. 6, 2022

(65) Prior Publication Data

US 2023/0196982 A1 Jun. 22, 2023

(30) Foreign Application Priority Data

Dec. 20, 2021 (KR) ........................ 10-2021-0183117

(51) Int. Cl.

*G09G 3/32* (2016.01)
*G09G 3/30* (2006.01)
*G09G 3/3225* (2016.01)
*G09G 3/3233* (2016.01)
*G09G 3/3275* (2016.01)
*G09G 3/3266* (2016.01)

(52) U.S. Cl.

CPC ................. *G09G 3/32* (2013.01); *G09G 3/30* (2013.01); *G09G 3/3225* (2013.01); *G09G 3/3233* (2013.01); *G09G 3/3275* (2013.01); *G09G 3/3266* (2013.01); *G09G 2300/0426* (2013.01); *G09G 2300/0842* (2013.01); *G09G 2310/027* (2013.01); *G09G 2310/08* (2013.01)

(58) Field of Classification Search

CPC ............. G09G 3/32; G09G 2300/0426; G09G 2310/027
USPC .................................................... 345/76, 204
See application file for complete search history.

(56) References Cited

U.S. PATENT DOCUMENTS

| | | | | |
|---|---|---|---|---|
| 8,779,666 B2 * | 7/2014 | Ko | G09G 3/3233 | 345/207 |
| 10,542,596 B1 * | 1/2020 | Talati | G09G 3/2022 | |
| 11,211,005 B2 * | 12/2021 | Hu | G09G 3/3233 | |
| 11,694,602 B2 * | 7/2023 | Cong | G09G 3/2014 | 345/691 |
| 2008/0211746 A1 * | 9/2008 | Caligiore | G09G 3/3233 | 345/76 |
| 2012/0242712 A1 * | 9/2012 | Ko | G09G 3/3233 | 345/212 |

(Continued)

*Primary Examiner* — Jason M Mandeville
(74) *Attorney, Agent, or Firm* — Morgan, Lewis & Bockius LLP

(57) ABSTRACT

A display panel includes a plurality of pixels. Each of the pixels includes a first transistor having a gate electrode connected to a first node and a first electrode to which a high level driving voltage is applied, a light emitting device having an anode electrode connected to a second electrode of the first transistor and a cathode electrode to which a low level driving voltage is applied, a second transistor applying a fixing voltage to the first node based on a first gate signal, a third transistor applying a data voltage to a second node based on the first gate signal, a fourth transistor connecting the second node to an input terminal for the low level driving voltage based on a second gate signal having a phase opposite to a phase of the first gate signal, and a capacitor between the first node and the second node.

16 Claims, 12 Drawing Sheets

(56) References Cited

U.S. PATENT DOCUMENTS

| | | | | |
|---|---|---|---|---|
| 2013/0069556 | A1* | 3/2013 | Wang | G09G 3/3233 315/240 |
| 2014/0055325 | A1* | 2/2014 | Qi | G09G 3/3258 315/227 R |

* cited by examiner

FIG. 7

| | |
|---|---|
| EVDD | 5V |
| EVSS | -7V |
| GSIG1 (ON) | -8V |
| GSIG1 (OFF) | 9V |
| GSIG2 (ON) | -8V |
| GSIG2 (OFF) | 9V |
| Vfix | 1V |
| Vdata | 1~7V |

FIG. 12

| | |
|---|---|
| EVDD | 5V |
| EVSS | -7V |
| GSIG1 (OFF) | -8V |
| GSIG1 (ON) | 9V |
| GSIG2 (OFF) | -8V |
| GSIG2 (ON) | 9V |
| Vfix | 7V |
| Vdata | 1~7V |

DISPLAY PANEL AND DISPLAY APPARATUS INCLUDING THE SAME

CROSS-REFERENCE TO RELATED APPLICATIONS

This application claims the benefit of the Korean Patent Application No. 10-2021-0183117 filed on Dec. 20, 2021, which is hereby incorporated by reference as if fully set forth herein.

BACKGROUND

Technical Field

The present disclosure relates to a display panel and a display apparatus including the same.

Discussion of the Related Art

In display apparatuses including self-emitting devices, due to the characteristic of the self-emitting devices, it is difficult to realize a fine low gray level. In the related art, various methods for increasing a low grayscale resolution have been proposed, but because a micro integrated circuit (IC) should be embedded into each pixel circuit or process efficiency is low due to a large number of transistors included in a pixel circuit, it is difficult to apply the methods.

SUMMARY

Accordingly, embodiments of the present disclosure are directed to a display panel and a display apparatus including the same that substantially obviate one or more of the problems due to limitations and disadvantages of the related art.

An aspect of the present disclosure is to provide a display panel and a display apparatus including the same, which may increase the performance of low grayscale expression in the display apparatus including self-emitting devices.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display panel comprises a plurality of pixels, wherein each of the plurality of pixels includes a first transistor including a gate electrode connected to a first node and a first electrode to which a high level driving voltage is applied, a light emitting device including an anode electrode connected to a second electrode of the first transistor and a cathode electrode to which a low level driving voltage is applied, a second transistor applying a predetermined fixing voltage to the first node on the basis of a first gate signal, a third transistor applying a data voltage for image expression to a second node on the basis of the first gate signal, a fourth transistor connecting the second node to an input terminal for the low level driving voltage on the basis of a second gate signal having a phase opposite to a phase of the first gate signal, and a capacitor connected between the first node and the second node.

In another aspect, a display apparatus comprises a display panel including a plurality of pixels connected to a data line, a first gate line, and a second gate line, a data driver applying a data voltage for image expression to the data line, and a gate driver supplying a first gate signal to the first gate line and supplying a second gate signal, having a phase opposite to a phase of the first gate signal, to the second gate line, wherein each of the plurality of pixels includes a first transistor including a gate electrode connected to a first node and a first electrode to which a high level driving voltage is applied, a light emitting device including an anode electrode connected to a second electrode of the first transistor and a cathode electrode to which a low level driving voltage is applied, a second transistor applying a predetermined fixing voltage to the first node on the basis of the first gate signal, a third transistor supplying the data voltage to a second node on the basis of the first gate signal, a fourth transistor connecting the second node to an input terminal for the low level driving voltage on the basis of a second gate signal, and a capacitor connected between the first node and the second node.

In yet another aspect, a method for driving the above mentioned display panel comprises: in a first period of one frame, supplying the first gate signal with an on level to the second transistor and the third transistor to turn on the second transistor and the third transistor, and supplying the second gate signal with an off level to the fourth transistor to turn off the fourth transistor; and in a second period of one frame succeeding the first period, supplying the first gate signal with an off level to the second transistor and the third transistor to turn off the second transistor and the third transistor, and supplying the second gate signal with an on level to the fourth transistor to turn on the fourth transistor, wherein in the second period, the data voltage at the second node of the capacitor is discharged until the voltage of the capacitor is up to a threshold voltage of the first transistor, and wherein a speed of discharging is based on a level of the data voltage.

It is to be understood that both the foregoing general description and the following detailed description are exemplary and explanatory and are intended to provide further explanation of the inventive concepts as claimed

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure. In the drawings:

FIG. 7 is a diagram showing driving voltages for driving the pixel of FIG. 2;

FIG. 12 is a diagram showing driving voltages for driving the pixel of FIG. 8.

DETAILED DESCRIPTION

Figure 1:
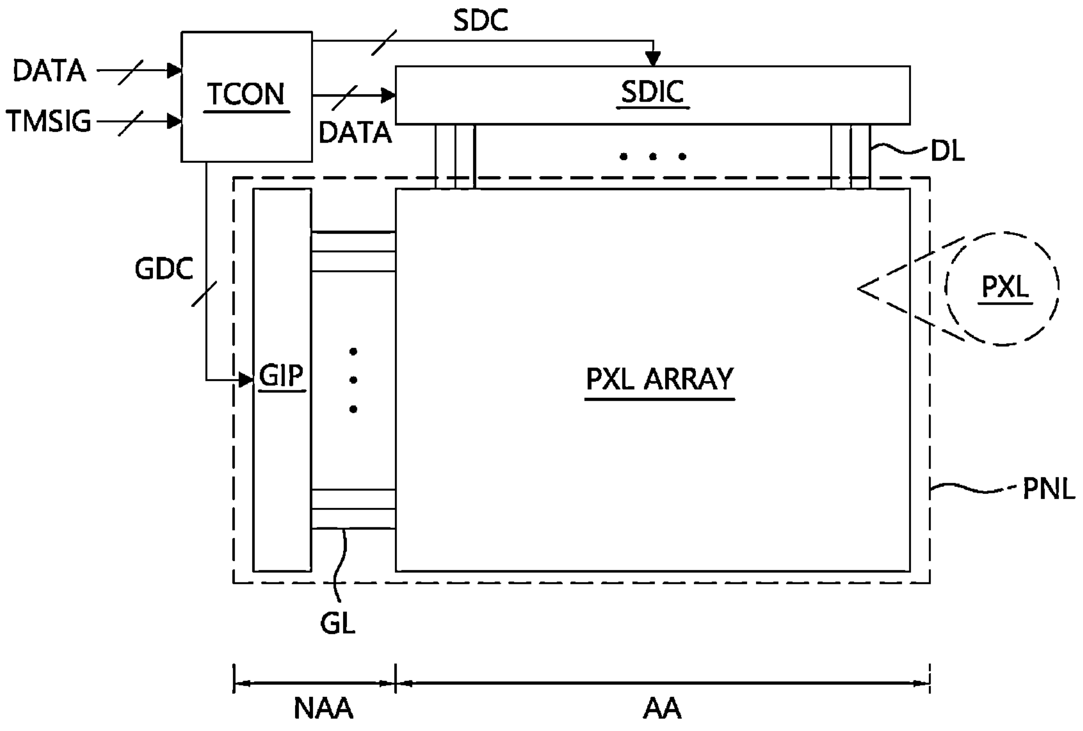
FIG. 1 is a diagram illustrating a display apparatus according to an embodiment of the present disclosure.

Hereinafter, exemplary embodiments of the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

A display apparatus according to embodiments of the present disclosure may be a self-emitting display apparatus such as an organic light emitting diode (OLED) display apparatus, a quantum dot display apparatus, or a micro light emitting diode (LED) display apparatus.

When the display apparatus according to embodiments of the present disclosure is an OLED display apparatus, each pixel may include an OLED, self-emitting light, as a self-emitting device. When the display apparatus according to embodiments of the present disclosure is a quantum dot display apparatus, each pixel may include a self-emitting device including a quantum dot which is a semiconductor crystal self-emitting light. When the display apparatus according to embodiments of the present disclosure is a micro LED display apparatus, each pixel may include, as a self-emitting device, a micro LED which self-emits light and includes an inorganic material.

In the following embodiments, a case where a display apparatus includes a self-emitting device based on a micro LED is illustrated, but the technical spirit of the present disclosure is not limited thereto and may be applied to all types of self-emitting display apparatuses.

FIG. 1 is a diagram illustrating a display apparatus according to an embodiment of the present disclosure.

Referring to FIG. 1, the display apparatus according to an embodiment of the present disclosure may include a display panel PNL, a timing controller TCON, a data driver SDIC, a gate driver GIP, and a power circuit.

Data lines DL extending in a column direction (or a vertical direction) and gate lines GL extending in a row direction (or a horizontal direction) may intersect with one another in a display area AA, displaying an input image, of the display panel PNL, and pixels PXL may be arranged in a matrix form to configure a pixel array in each intersection region. Each of the data lines DL may be connected to pixels PXL adjacent thereto in the column direction in common, and each of the gate lines GL may be connected to pixels PXL adjacent thereto in the row direction. Each of the pixels PXL may include a self-emitting device implemented with a micro LED.

The timing controller TCON may receive a timing signal such as a vertical synchronization signal, a horizontal synchronization signal, a data enable signal, and a dot clock from a host system and may generate a source timing control signal SDC for controlling an operation of the data driver SDIC and a gate timing control signal GDC for controlling an operation of the gate driver GIP, on the basis of the timing signal. The timing controller TCON may supply the source timing control signal SDC to the data driver SDIC and may supply the gate timing control signal GDC to the gate driver GIP.

The timing controller TCON may receive video data DATA from the host system and may execute a predetermined image quality enhancement algorithm to correct the video data DATA. The timing controller TCON may supply corrected video data DATA to the data driver SDIC through an internal interface circuit.

The data driver SDIC may be connected to the pixels PXL through the data lines DL. The data driver SDIC may generate data voltages needed for driving of the pixels PXL on the basis of the source timing control signal SDC and may supply the data voltages to the data lines DL. The data driver SDIC may divide a predetermined gamma reference voltage to generate gamma compensation voltages and may map the gamma compensation voltages to the video data DATA to generate data voltages. The data driver SDIC may include a shift register, a latch, a digital-to-analog converter, and an output buffer.

The gate driver GIP may be connected to the pixels PXL through the gate lines GL. The gate driver GIP may generate gate signals on the basis of the gate timing control signal GDC and may supply the gate timing control signal GDC to the gate lines GL on the basis of a supply timing of a data voltage. Pixel columns to which data voltages are to be supplied may be selected by the gate signals.

Two gate lines GL may be connected to each pixel row, and each pixel PXL may be driven by two gate signals. Each of gate signals may have a pulse which swings between an on level and an off level. A gate signal having an on level may be set to a voltage which is higher than a threshold voltage of a transistor included in the pixel PXL, and a gate signal having an off level may be set to a voltage which is lower than the threshold voltage of the transistor. The transistor included in the pixel PXL may be a transistor where a gate electrode thereof is connected to the gate line GL, and the transistor may be turned on in response to the gate signal having an on level and may be turned off in response to the gate signal having an off level.

The gate driver GIP may be implemented with a gate shift register including a plurality of gate output stages. Input/output terminals of the gate output stages may be connected to each other in a cascade scheme. The gate output stages may be independently connected to the gate lines GL and may output the gate signals to the gate lines GL. The gate shift register may be directly provided as a gate driver in panel type in a bezel area NAA, which does not display an image, of the display panel PNL. The bezel area NAA may be disposed outside the display area AA.

The power circuit may boost an input direct current (DC) voltage to generate a high level driving voltage, a low level driving voltage, and a fixing voltage needed for driving of the pixels PXL, generate a gate high voltage and a gate low voltage needed for driving of the gate driver GIP, and generate a gamma source voltage needed for driving of the data driver SDIC.

The display apparatus according to the present embodiment may not use a method of expressing a gray level on the basis of a level of a driving current applied to a light emitting device in a state where an emission period is fixed in one frame. The display apparatus according to the present embodiment may control a time length, where a light emitting device is turned on in one frame, on the basis of a data voltage so as to increase the performance of low grayscale expression, and thus, may express a gray level on the basis of an on duty of the light emitting device. To this end, the display apparatus according to the present embodiment may perform a method which adjusts an on/off timing of a driving transistor by using a characteristic where a capacitor is discharged in the pixel PXL, and thus, may drive the light emitting device through PWM driving (i.e., duty driving). The following embodiments relate to a driving concept and a pixel configuration for duty-driving a light emitting device.

First Embodiment

Figure 2:
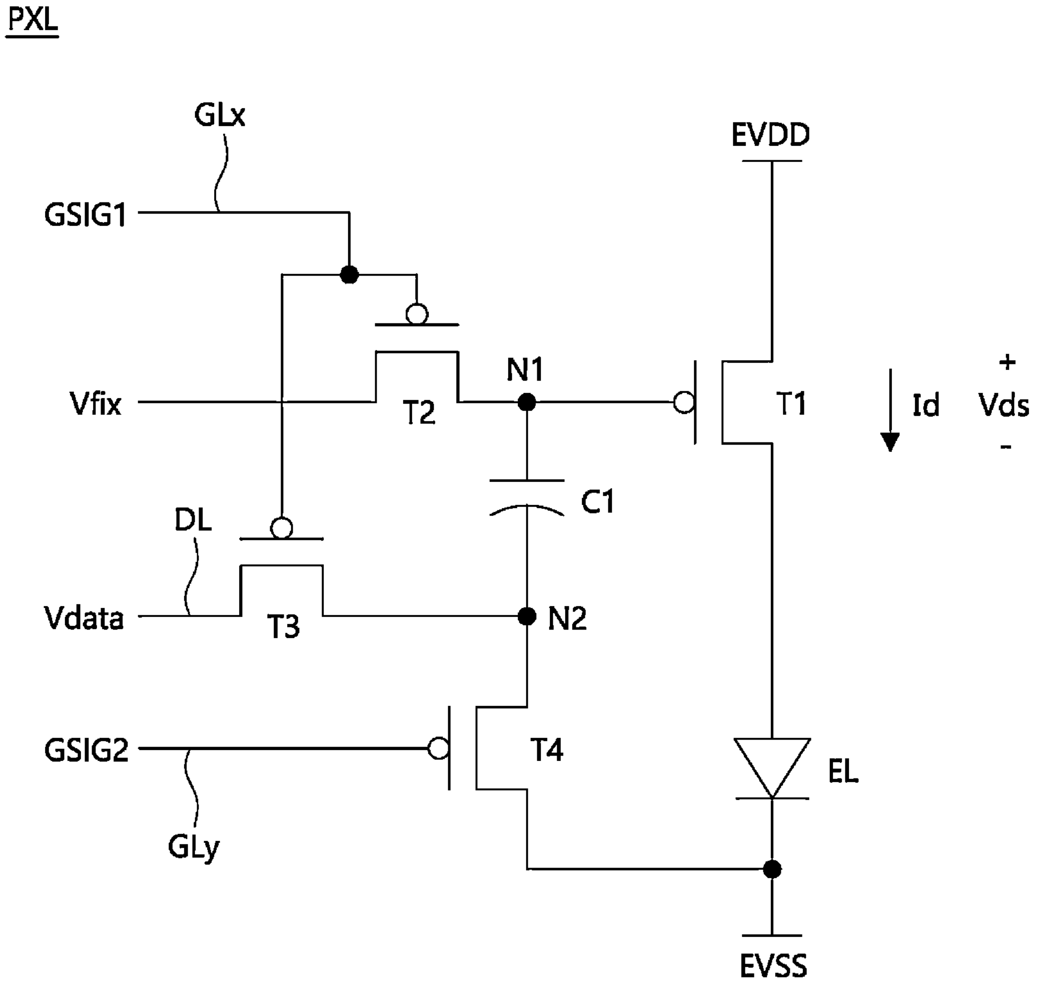
FIG. 2 is a diagram illustrating a first embodiment of one pixel included in a display panel.
Figure 3:
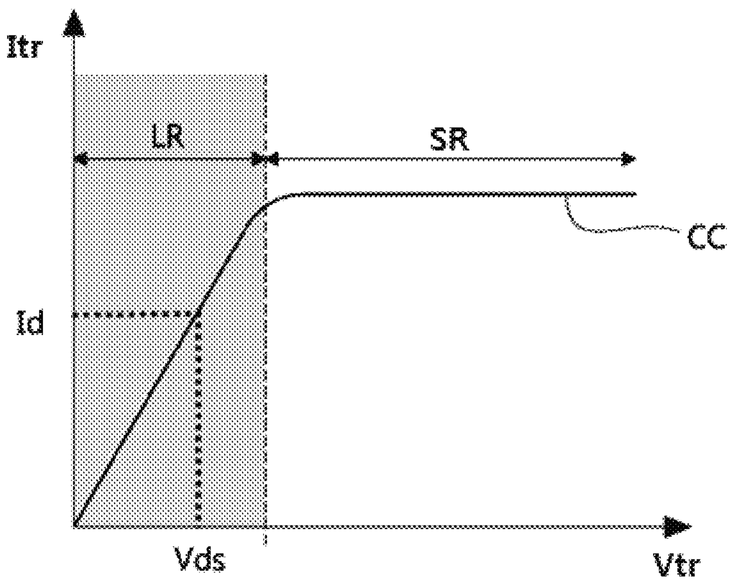
FIG. 3 is a diagram illustrating a characteristic curve of a driving transistor included in the pixel of FIG. 2.
Figure 4:
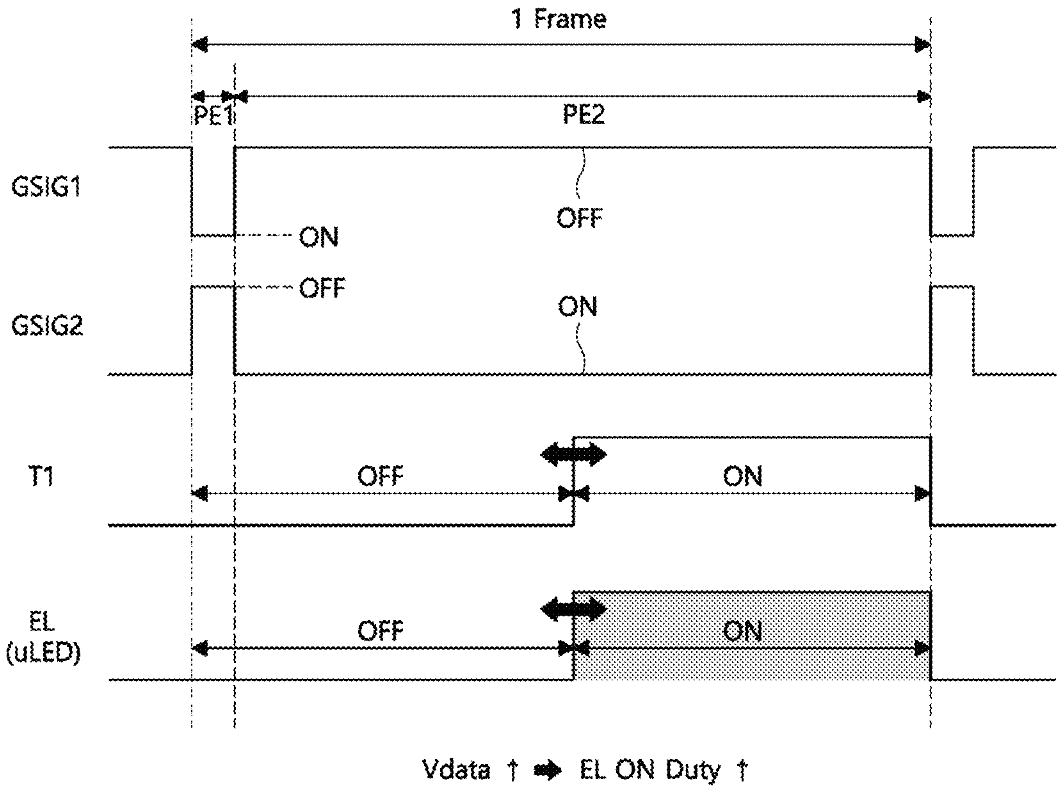
FIG. 4 is a diagram showing a driving waveform of the pixel of FIG. 2.
Figure 5:
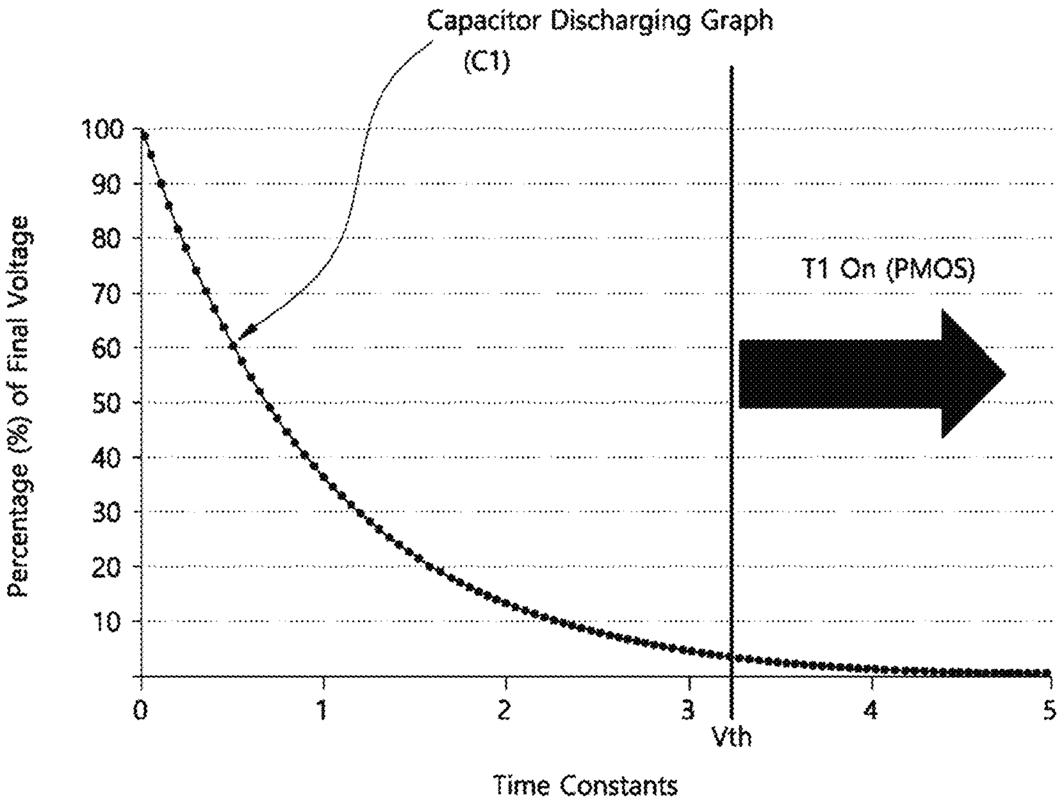
FIG. 5 is a diagram showing a discharging graph of a capacitor included in the pixel of FIG. 2.
Figure 6:
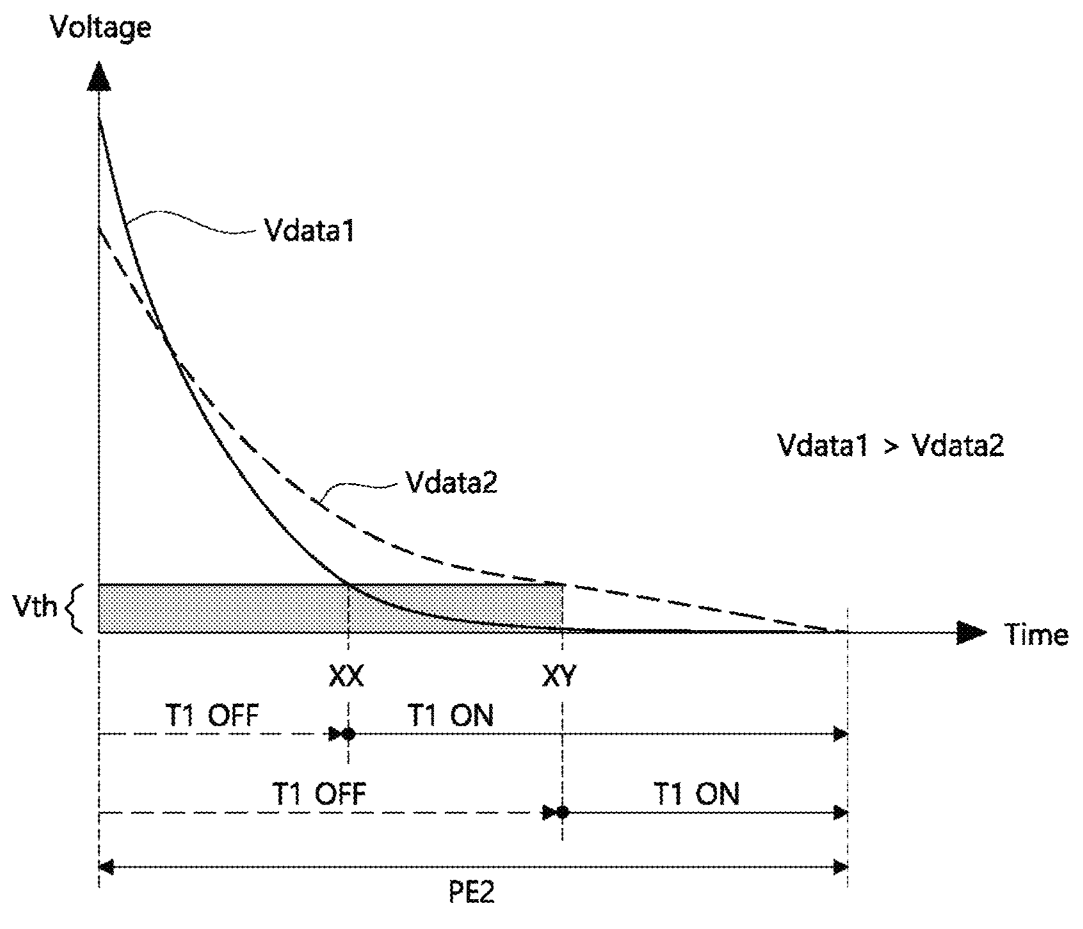
FIG. 6 is a diagram showing an example where an on duty of a driving transistor varies based on a level of a data voltage in the pixel of FIG. 2.

FIG. 2 is a diagram illustrating a first embodiment of one pixel PXL included in a display panel PNL. FIG. 3 is a diagram illustrating a characteristic curve of a driving transistor T1 included in the pixel PXL of FIG. 2. FIG. 4 is a diagram showing a driving waveform of the pixel PXL of FIG. 2. FIG. 5 is a diagram showing a discharging graph of a capacitor C1 included in the pixel PXL of FIG. 2. FIG. 6 is a diagram showing an example where an on duty of the driving transistor T1 varies based on a level of a data voltage Vdata in the pixel PXL of FIG. 2. FIG. 7 is a diagram showing driving voltages for driving the pixel PXL of FIG. 2.

Referring to FIG. 2, a pixel PXL according to the first embodiment of the present disclosure may include a light emitting device EL, first to fourth transistors T1 to T4, and a capacitor C1. The first to fourth transistors T1 to T4 may each be implemented as a P-type metal oxide semiconductor field effect transistor (MOSFET).

The first transistor T1 may be a driving element which includes a gate electrode connected to a first node N1, a first electrode to which a high level driving voltage EVDD is applied, and a second electrode connected to a light emitting device EL. The first transistor T1 may be a constant current driving element where an on/off timing is adjusted based on a discharging speed of the capacitor C1. The first transistor T1 may be the constant current driving element for duty driving, and thus, a level of a driving current Id flowing in the first transistor T1 may be constant regardless of a level of a data voltage Vdata in an on duty period of the first transistor T1.

The first transistor T1, as in FIG. 3, may not operate in a saturation region SR in a characteristic curve CC of a transistor current Itr based on a drain-source voltage Vtr and may operate in a linear region LR. The first transistor T1 may generate the driving current Id having a certain level corresponding to a drain-source voltage Vds in the linear region LR. The drain-source voltage Vds of the linear region LR may be lower than a drain-source voltage of the saturation region SR, and thus, in a case where the first transistor T1 operates in the linear region LR, the high level driving voltage EVDD may be used to be relatively lower, thereby decreasing power consumption by a reduction in high level driving voltage EVDD. Because the first transistor T1 operates in the linear region LR, the driving current Id flowing in the first transistor T1 may be a constant current irrelevant to a level of a data voltage. Because the first transistor T1 does not function as an analog current generating element for controlling a level of a drain current on the basis of a level of the data voltage and functions as a switch, it may not be required to compensate for a driving characteristic deviation (a threshold voltage deviation and/or an electron mobility deviation) of the first transistor T1 between pixels. Therefore, in the present embodiment, an additional circuit for sampling and compensating for a driving characteristic of the first transistor T1 may not be needed in or outside the pixel PXL, and thus, a circuit configuration may be simplified.

The light emitting device EL may be implemented with a micro LED which includes an anode electrode connected to the second electrode of the first transistor T1, a cathode electrode to which a low level driving voltage EVSS is applied, and an inorganic light emitting layer disposed between the anode electrode and the cathode electrode. The light emitting device EL may be turned on based on the driving current Id input from the first transistor T1. When the first transistor T1 is duty-driven, the light emitting device EL may also be duty-driven, and thus, an on duty of the light emitting device EL may be based on an on duty of the first transistor T1.

The second transistor T2 may apply a predetermined fixing voltage Vfix to a first node N1 on the basis of a first gate signal GSIG1. A gate electrode of the second transistor T2 may be connected to a first gate line GLx, a first electrode thereof may be connected to a power line to which the fixing voltage Vfix is applied, and a second electrode thereof may be connected to the first node N1.

The third transistor T3 may apply a data voltage Vdata for image expression to a second node N2 on the basis of the first gate signal GSIG1. A gate electrode of the third transistor T3 may be connected to the first gate line GLx, a first electrode thereof may be connected to a data line DL to which the data voltage Vdata is applied, and a second electrode thereof may be connected to the second node N2.

The fourth transistor T4 may connect the second node N2 to an input terminal for the low level driving voltage EVSS on the basis of a second gate signal GSIG2 having a phase opposite to that of the first gate signal GSIG1. A gate electrode of the fourth transistor T4 may be connected to a second gate line GLy, a first electrode thereof may be connected to the second node N2, and a second electrode thereof may be connected to the input terminal for the low level driving voltage EVSS.

The capacitor C1 may be connected between the first node N1 and the second node N2.

The pixel PXL according to the first embodiment may operate based on a driving waveform of FIG. 4. One frame for driving the pixel PXL may include a first period PE1 and a second period PE2 succeeding the first period PE1.

The first period PE1 may be a programming period for respectively fixing the first node N1 and the second node N2 to the fixing voltage Vfix and the data voltage Vdata. In the first period PE1, the first gate signal GSIG1 may maintain an on level, and the second gate signal GSIG2 may maintain an off level.

In the first period PE1, the second transistor T2 and the third transistor T3 may be turned on in response to the first gate signal GSIG1 having an on level, and the fourth transistor T4 may be turned off in response to the second gate signal GSIG2 having an off level. As a result, the fixing voltage Vfix may be charged into the first node N1 through the second transistor T2, and the data voltage Vdata may be charged into the second node N2 through the third transistor T3. A level of the data voltage Vdata may vary based on a gray level of an image within a predetermined voltage range. In this case, the fixing voltage Vfix may be set to be equal to a level of the data voltage Vdata which is lowest within a voltage range where the data voltage Vdata varies, and thus, on-duty control performed on the first transistor T1 based on a P-type MOSFET may be easily implemented. However, a level of the fixing voltage Vfix may be differently set based on a design spec and a model.

The second period PE2 may be a discharging period where the data voltage Vdata of the second node N2 is discharged through the fourth transistor T4. In the second period PE2, the first gate signal GSIG1 may maintain an off level, and the second gate signal GSIG2 may maintain an on level.

In the second period PE2, the second transistor T2 and the third transistor T3 may be turned off in response to the first gate signal GSIG1 having an off level, and the fourth transistor T4 may be turned on in response to the second gate signal GSIG2 having an on level. As a result, the data voltage Vdata of the second node N2 may be discharged to an input terminal for the low level driving voltage EVSS through the fourth transistor T4. The low level driving voltage EVSS may be a low voltage outside a voltage range where the data voltage Vdata varies.

When the data voltage Vdata of the second node N2 is discharged in the second period PE2, the fixing voltage Vfix of the first node N1 may be lowered by a coupling effect through the capacitor C1. As illustrated in FIG. 5, when a voltage of the capacitor C1 is shifted to a threshold voltage Vth of the first transistor T1 by a discharging operation through the fourth transistor T4, the first transistor T1 may be turned on.

In the second period PE2, an on duty of the first transistor T1 may vary based on a speed at which the data voltage Vdata of the second node N2 is discharged until the voltage of the capacitor is up to the threshold voltage of the first transistor T1. A discharging speed may increase as a level of the data voltage Vdata of the second node N2 increases within a voltage range where the data voltage Vdata varies. When the discharging speed increases, an on duty of the first transistor T1 may increase by the increase in the second period PE2. When the data voltage Vdata has a first level, an on duty of the first transistor T1 may have a first value, and when the data voltage Vdata has a second level which is higher than the first level, an on duty of the first transistor T1 may have a second value which is greater than the first value.

For example, as illustrated in FIG. 6, when a level of the data voltage Vdata of the second node N2 is "Vdata1" which is relatively high, a voltage of the capacitor C1 may be shifted to the threshold voltage Vth of the first transistor T1 at a first timing XX at a relatively fast discharging speed. In this case, the first transistor T1 may have a first on duty period which starts from the first timing XX in the second period PE2.

On the other hand, when a level of the data voltage Vdata of the second node N2 is "Vdata2" which is relatively low, a voltage of the capacitor C1 may be shifted to the threshold voltage Vth of the first transistor T1 at a relatively slow discharging speed at a second timing XY which is later than the first timing XX. In this case, the first transistor T1 may have a second on duty period starting from the second timing XY in the second period PE2. The second on duty may be less than the first on duty.

Driving voltages for driving the pixel PXL, as in FIG. 7, may include a high level driving voltage EVDD of 5 V, a low level driving voltage EVSS of −7 V, a gate-on voltage of −8 V, a gate-off voltage of 9 V, a fixing voltage Vfix of 1 V, and a data voltage Vdata having a voltage range of 1 V to 7 V. The illustration of FIG. 7 may be merely an embodiment, and thus, the technical spirit of the present disclosure is not limited to the detailed numerical values of FIG. 7.

Second Embodiment

Figure 8:
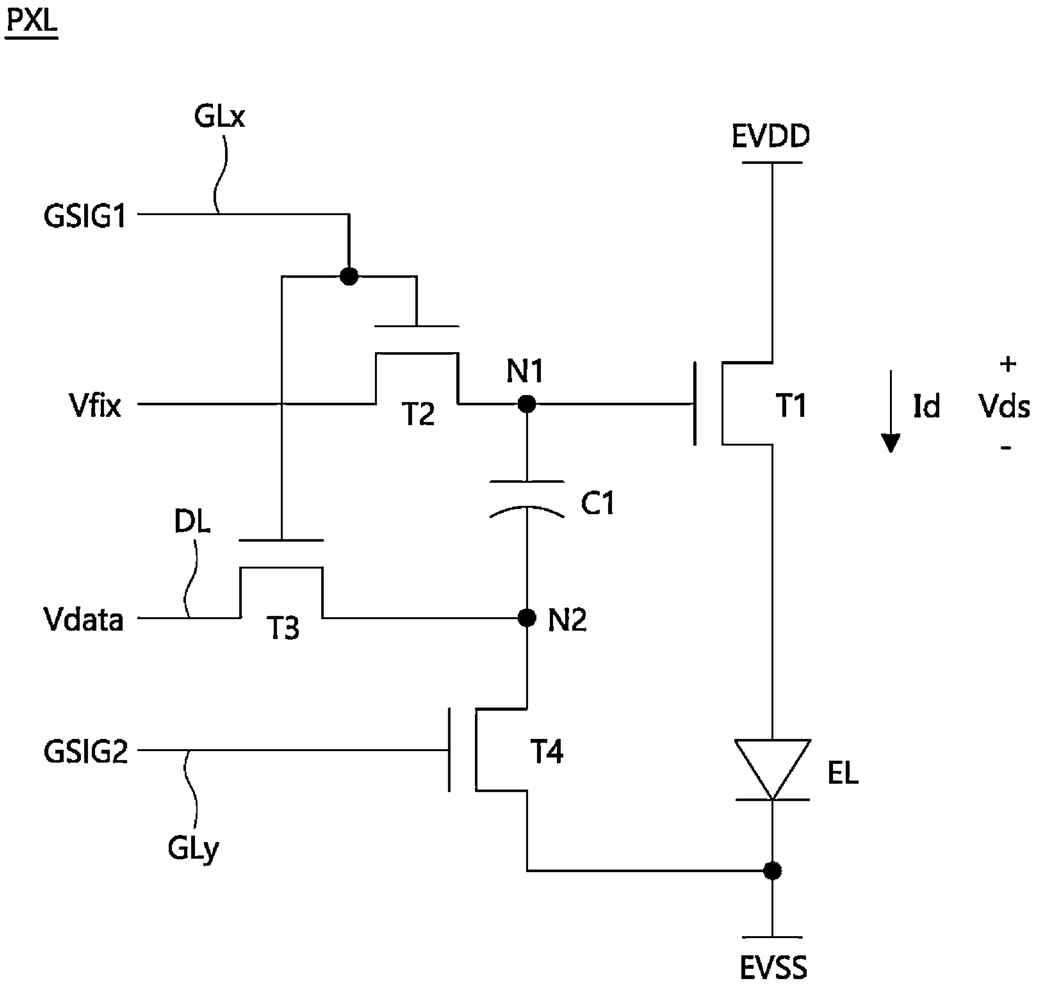
FIG. 8 is a diagram illustrating a second embodiment of one pixel included in a display panel.
Figure 9:
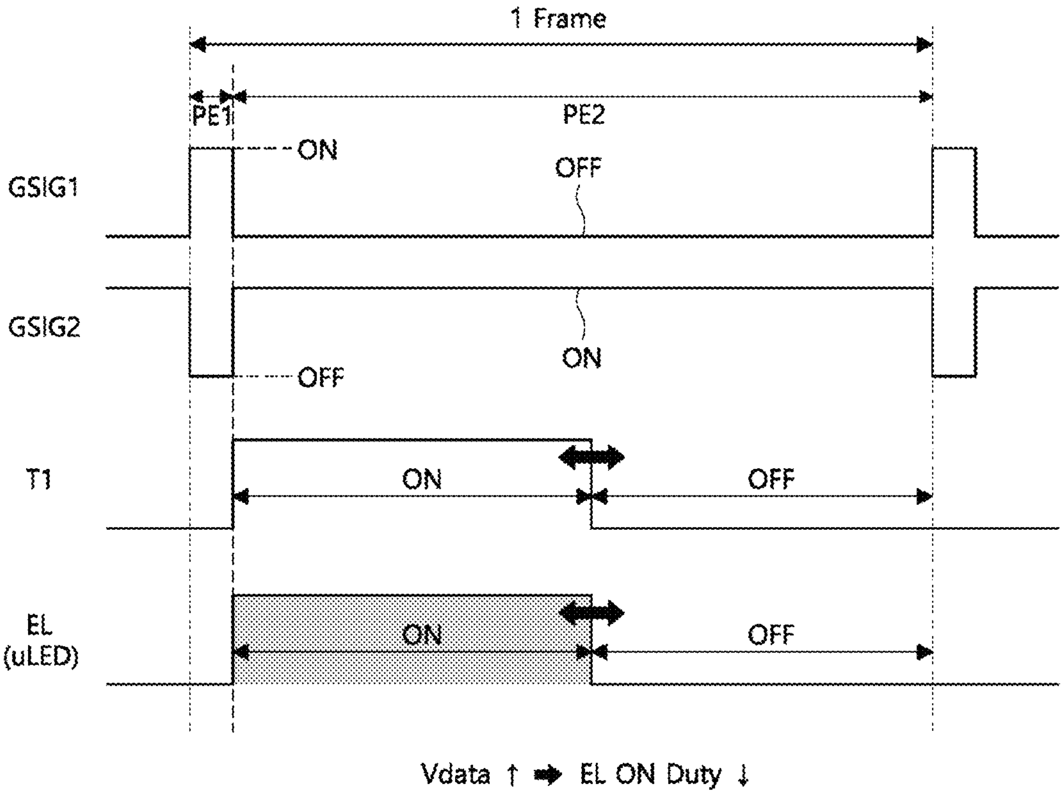
FIG. 9 is a diagram showing a driving waveform of the pixel of FIG. 8.
Figure 10:
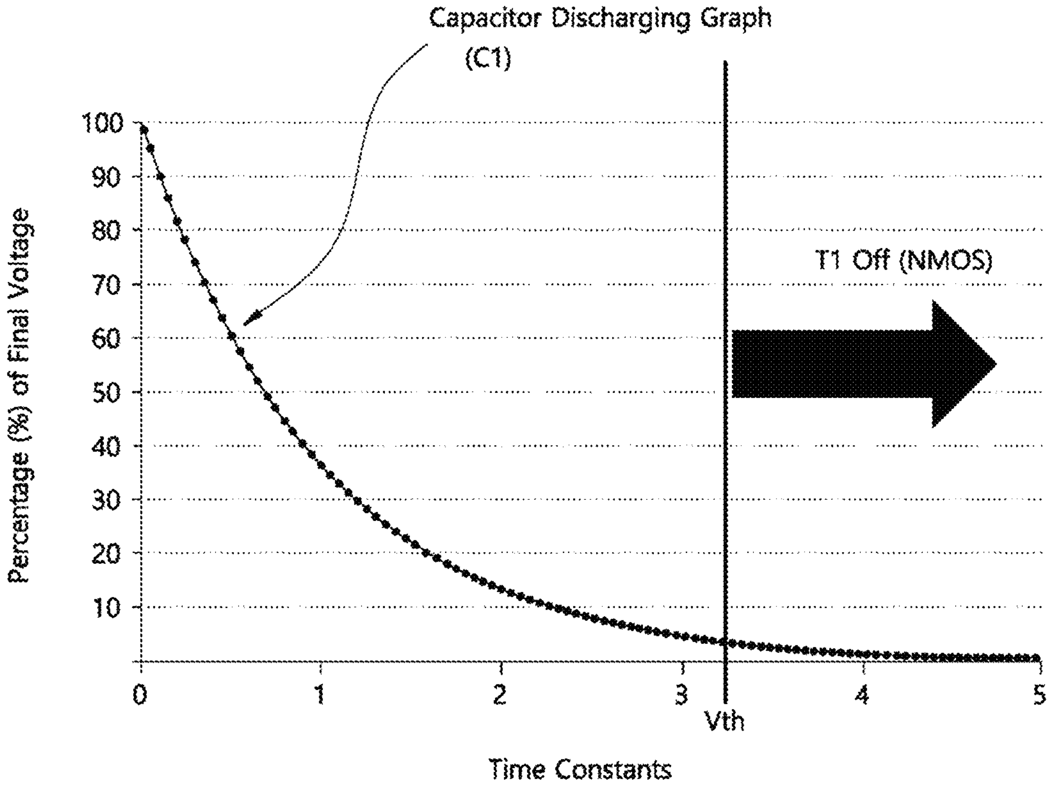
FIG. 10 is a diagram showing a discharging graph of a capacitor included in the pixel of FIG. 8.
Figure 11:
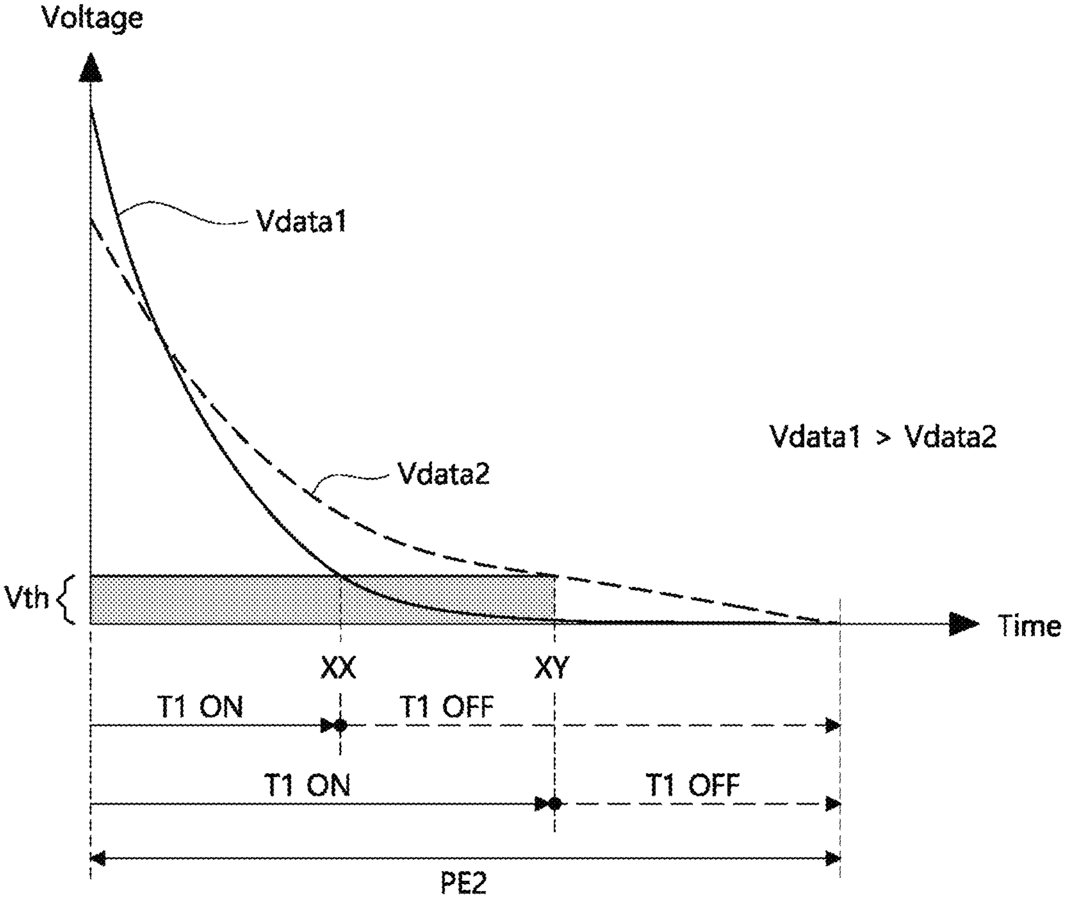
FIG. 11 is a diagram showing an example where an on duty of a driving transistor varies based on a level of a data voltage in the pixel of FIG. 8.

FIG. 8 is a diagram illustrating a second embodiment of one pixel included in a display panel. FIG. 9 is a diagram showing a driving waveform of the pixel of FIG. 8. FIG. 10 is a diagram showing a discharging graph of a capacitor included in the pixel of FIG. 8. FIG. 11 is a diagram showing an example where an on duty of a driving transistor varies based on a level of a data voltage in the FIG. 8. FIG. 12 is a diagram showing driving voltages for driving the pixel of FIG. 8.

Referring to FIG. 8, a pixel PXL according to the second embodiment of the present disclosure may include a light emitting device EL, first to fourth transistors T1 to T4, and a capacitor C1. The first to fourth transistors T1 to T4 may each be implemented as an N-type MOSFET.

The first transistor T1 may be a driving element which includes a gate electrode connected to a first node N1, a first electrode to which a high level driving voltage EVDD is applied, and a second electrode connected to a light emitting device EL. The first transistor T1 may be a constant current driving element where an on/off timing is adjusted based on a discharging speed of the capacitor C1. The first transistor T1 may be the constant current driving element for duty driving, and thus, a level of a driving current Id flowing in the first transistor T1 may be constant regardless of a level of a data voltage Vdata in an on duty period of the first transistor T1.

The first transistor T1, as in FIG. 3, may not operate in a saturation region SR in a characteristic curve CC of a transistor current Itr based on a drain-source voltage Vtr and may operate in a linear region LR. The first transistor T1 may generate the driving current Id having a certain level corresponding to a specific drain-source voltage Vds in the linear region LR. The drain-source voltage Vds of the linear region LR may be lower than a drain-source voltage of the saturation region SR, and thus, in a case where the first transistor T1 operates in the linear region LR, the high level driving voltage EVDD may be used to be relatively lower, thereby decreasing power consumption by a reduction in high level driving voltage EVDD. Because the first transistor T1 operates in the linear region LR, the driving current Id flowing in the first transistor T1 may be a constant current irrelevant to a level of a data voltage. Because the first transistor T1 does not function as an analog current generating element for controlling a level of a drain current on the basis of a level of the data voltage and functions as a switch, it may not be required to compensate for a driving characteristic deviation (a threshold voltage deviation and/or an electron mobility deviation) of the first transistor T1 between pixels. Therefore, in the present embodiment, an additional circuit for sampling and compensating for a driving characteristic of the first transistor T1 may not be needed in or outside the pixel PXL, and thus, a circuit configuration may be simplified.

The light emitting device EL may be implemented with a micro LED which includes an anode electrode connected to the second electrode of the first transistor T1, a cathode electrode to which a low level driving voltage EVSS is applied, and an inorganic light emitting layer disposed between the anode electrode and the cathode electrode. The light emitting device EL may be turned on based on the driving current Id input from the first transistor T1. When the first transistor T1 is duty-driven, the light emitting device EL may also be duty-driven, and thus, an on duty of the light emitting device EL may be based on an on duty of the first transistor T1.

The second transistor T2 may apply a predetermined fixing voltage Vfix to a first node N1 on the basis of a first gate signal GSIG1. A gate electrode of the second transistor T2 may be connected to a first gate line GLx, a first electrode thereof may be connected to a power line to which the fixing voltage Vfix is applied, and a second electrode thereof may be connected to the first node N.

The third transistor T3 may apply a data voltage Vdata for image expression to a second node N2 on the basis of the first gate signal GSIG1. A gate electrode of the third transistor T3 may be connected to the first gate line GLx, a first electrode thereof may be connected to a data line DL to which the data voltage Vdata is applied, and a second electrode thereof may be connected to the second node N2.

The fourth transistor T4 may connect the second node N2 to an input terminal for the low level driving voltage EVSS on the basis of a second gate signal GSIG2 having a phase opposite to that of the first gate signal GSIG1. A gate electrode of the fourth transistor T4 may be connected to a second gate line GLy, a first electrode thereof may be connected to the second node N2, and a second electrode thereof may be connected to the input terminal for the low level driving voltage EVSS.

The capacitor C1 may be connected between the first node N1 and the second node N2.

The pixel PXL according to the second embodiment may operate based on a driving waveform of FIG. 9. One frame for driving the pixel PXL may include a first period PE1 and a second period PE2 succeeding the first period PE1.

The first period PE1 may be a programming period for respectively fixing the first node N1 and the second node N2 to the fixing voltage Vfix and the data voltage Vdata. In the first period PE1, the first gate signal GSIG1 may maintain an on level, and the second gate signal GSIG2 may maintain an off level.

In the first period PE1, the second transistor T2 and the third transistor T3 may be turned on in response to the first gate signal GSIG1 having an on level, and the fourth transistor T4 may be turned off in response to the second gate signal GSIG2 having an off level. As a result, the fixing voltage Vfix may be charged into the first node N1 through the second transistor T2, and the data voltage Vdata may be charged into the second node N2 through the third transistor T3. A level of the data voltage Vdata may vary based on a gray level of an image within a predetermined voltage range. In this case, the fixing voltage Vfix may be set to be equal to a level of the data voltage Vdata which is lowest within a voltage range where the data voltage Vdata varies, and thus, on-duty control performed on the first transistor T1 based on an N-type MOSFET may be easily implemented. However, a level of the fixing voltage Vfix may be differently set based on a design spec and a model.

The second period PE2 may be a discharging period where the data voltage Vdata of the second node N2 is discharged through the fourth transistor T4. In the second period PE2, the first gate signal GSIG1 may maintain an off level, and the second gate signal GSIG2 may maintain an on level.

In the second period PE2, the second transistor T2 and the third transistor T3 may be turned off in response to the first gate signal GSIG1 having an off level, and the fourth transistor T4 may be turned on in response to the second gate signal GSIG2 having an on level. As a result, the data voltage Vdata of the second node N2 may be discharged to an input terminal for the low level driving voltage EVSS through the fourth transistor T4. The low level driving voltage EVSS may be a low voltage outside a voltage range where the data voltage Vdata varies.

When the data voltage Vdata of the second node N2 is discharged in the second period PE2, the fixing voltage Vfix of the first node N1 may be lowered by a coupling effect through the capacitor C1. As illustrated in FIG. 10, when a voltage of the capacitor C1 is shifted to a threshold voltage Vth of the first transistor T1 by a discharging operation through the fourth transistor T4, the first transistor T1 may be turned off.

In the second period PE2, an on duty of the first transistor T1 may vary based on a speed at which the data voltage Vdata of the second node N2 is discharged until the voltage of the capacitor is up to the threshold voltage of the first transistor T1. A discharging speed may increase as a level of the data voltage Vdata of the second node N2 increases within a voltage range where the data voltage Vdata varies. When the discharging speed increases, an on duty of the first transistor T1 may decrease by the increase in the second period PE2. When the data voltage Vdata has a first level, an on duty of the first transistor T1 may have a first value, and when the data voltage Vdata has a second level which is higher than the first level, an on duty of the first transistor T1 may have a second value which is less than the first value.

For example, as illustrated in FIG. 11, when a level of the data voltage Vdata of the second node N2 is "Vdata1" which is relatively high, a voltage of the capacitor C1 may be shifted to the threshold voltage Vth of the first transistor T1 at a first timing XX at a relatively fast discharging speed. In this case, the first transistor T1 may have a first on duty period which ends at the first timing XX in the second period PE2.

On the other hand, when a level of the data voltage Vdata of the second node N2 is "Vdata2" which is relatively low, and a voltage of the capacitor C1 may be shifted to the threshold voltage Vth of the first transistor T1 at a relatively slow discharging speed at a second timing XY which is later than the first timing XX. In this case, the first transistor T1 may have a second on duty period which ends at the second timing XY in the second period PE2. The second on duty may be greater than the first on duty.

Driving voltages for driving the pixel PXL, as in FIG. 12, may include a high level driving voltage EVDD of 5 V, a low level driving voltage EVSS of −7 V, a gate-off voltage of −8 V, a gate-on voltage of 9 V, a fixing voltage Vfix of 7 V, and a data voltage Vdata having a voltage range of 1 V to 7 V. The illustration of FIG. 12 may be merely an embodiment, and thus, the technical spirit of the present disclosure is not limited to the detailed numerical values of FIG. 12.

The embodiments of the present disclosure may realize the following effects.

According to the embodiments of the present disclosure, an on/off timing of a driving transistor may be adjusted by using a characteristic where a capacitor is discharged in a pixel, and thus, a light emitting device may perform PWM driving (i.e., duty driving). Also, in the embodiments of the present disclosure, a time length where the light emitting device is turned on in one frame may be controlled based on a data voltage by using the PWM scheme, and thus, a gray level may be expressed, thereby considerably increasing the performance of low grayscale expression.

The effects according to the present disclosure are not limited to the above examples, and other various effects may be included in the specification.

During the description on the pixel and the display panel including a plurality of the pixels, a method for driving the display panel is also described. The method includes: in a first period of one frame, supplying the first gate signal with an on level to the second transistor and the third transistor to turn on the second transistor and the third transistor, and supplying the second gate signal with an off level to the fourth transistor to turn off the fourth transistor; and in a second period of one frame succeeding the first period, supplying the first gate signal with an off level to the second transistor and the third transistor to turn off the second transistor and the third transistor, and supplying the second gate signal with an on level to the fourth transistor to turn on the fourth transistor, wherein in the second period, the data voltage at the second node of the capacitor is discharged until the voltage of the capacitor is up to a threshold voltage of the first transistor, and wherein a speed of discharging is based on a level of the data voltage.

Further, the high level driving voltage is provided so that the first transistor operates in a linear region in a characteristic curve of a transistor current based on a drain-source voltage. The details described previously are also applicable to the method, which are not repeated herein.

It will be apparent to those skilled in the art that various modifications and variations can be made in the display panel and the display apparatus including the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display panel, comprising:
a plurality of pixels,
wherein each of the plurality of pixels comprises:
a first transistor including a gate electrode connected to a first node and a first electrode to which a high level driving voltage is for being applied;
a light emitting device including an anode electrode connected to a second electrode of the first transistor and a cathode electrode to which a low level driving voltage is for being applied;
a second transistor for supplying a predetermined fixing voltage to the first node on the basis of a first gate signal;
a third transistor for supplying a data voltage for image expression to a second node on the basis of the first gate signal;
a fourth transistor connecting the second node to an input terminal for the low level driving voltage on the basis of a second gate signal having a phase opposite to a phase of the first gate signal; and
a capacitor connected between the first node and the second node, and
wherein a level of a driving current flowing in the light emitting device during an on duty period of the light emitting device is to be constant regardless of a level of the data voltage,
wherein one frame comprises a first period and a second period succeeding the first period,
wherein during the first period, the first gate signal is to maintain an on level and the second gate signal is to maintain an off level,
wherein during the second period, the first gate signal is to maintain an off level and the second gate signal is to maintain an on level,
wherein the on duty period of the light emitting device has a length shorter than the second period, and is to vary depending on the level of the data voltage within the second period,
wherein the one frame has no more than one on-duty period of the light emitting device,
wherein the on duty period of the light emitting device is set based on a discharge speed at which the data voltage of the second node is discharged until a voltage of the capacitor is up to a threshold voltage of the first transistor, and
wherein the discharge speed for a first data voltage of a first level is faster than the discharge speed for a second data voltage of a second level which is lower than the first level.

2. The display panel of claim 1, wherein the first transistor is configured to operate in a linear region in a characteristic curve of a transistor current based on a drain-source voltage,
the level of the driving current flowing in the first transistor is to be constant regardless of the level of the data voltage during an on duty period of the first transistor, and
the on duty period of the light emitting device corresponds to the on duty period of the first transistor.

3. The display panel of claim 2, wherein the on duty period of the first transistor is to vary based on the level of the data voltage, and
wherein the on duty period of the light emitting device is to vary based on the level of the data voltage.

4. The display panel of claim 3, wherein each of the first to fourth transistors is implemented with a P-type metal oxide semiconductor field effect transistor MOSFET,
the level of the data voltage is to vary based on a gray level of an image within a predetermined voltage range, and
a level of the predetermined fixing voltage is to be the same as a level of the data voltage which is lowest within the predetermined voltage range.

5. The display panel of claim 4, wherein, when the data voltage has a first level, the on duty period of the first transistor has a first value, and
when the data voltage has a second level which is higher than the first level, the on duty period of the first transistor has a second value which is greater than the first value.

6. The display panel of claim 3, wherein each of the first to fourth transistors is implemented with an N-type metal oxide semiconductor field effect transistor MOSFET,
the level of the data voltage is to vary based on a gray level of an image within a predetermined voltage range, and
a level of the predetermined fixing voltage is to be the same as a level of the data voltage which is highest within the predetermined voltage range.

7. The display panel of claim 6, wherein, when the data voltage has a first level, the on duty period of the first transistor has a first value, and
when the data voltage has a second level which is higher than the first level, the on duty period of the first transistor has a second value which is less than the first value.

8. A method for driving the display panel according to claim 1, comprising:
during the first period of the one frame, supplying the first gate signal with the on level to the second transistor and the third transistor to turn on the second transistor and the third transistor, and supplying the second gate signal with the off level to the fourth transistor to turn off the fourth transistor; and
during the second period of the one frame succeeding the first period, supplying the first gate signal with the off level to the second transistor and the third transistor to turn off the second transistor and the third transistor, and supplying the second gate signal with the on level to the fourth transistor to turn on the fourth transistor, wherein during the second period, the data voltage at the second node of the capacitor is to be discharged until a voltage of the capacitor is up to a threshold voltage of the first transistor, and wherein a speed of discharging is based on the level of the data voltage.

9. The method according to claim 8, further comprising: providing the high level driving voltage so that the first transistor operates in a linear region in a characteristic curve of a transistor current based on a drain-source voltage.

10. A display apparatus, comprising:

a display panel including a plurality of pixels connected to a data line, a first gate line, and a second gate line;

a data driver for supplying a data voltage for image expression to the data line; and a gate driver for supplying a first gate signal to the first gate line and supplying a second gate signal, having a phase opposite to a phase of the first gate signal, to the second gate line, wherein each of the plurality of pixels comprises:

a first transistor including a gate electrode connected to a first node and a first electrode to which a high level driving voltage is for being applied;

a light emitting device including an anode electrode connected to a second electrode of the first transistor and a cathode electrode to which a low level driving voltage is for being applied;

a second transistor for supplying a predetermined fixing voltage to the first node on the basis of the first gate signal;

a third transistor for supplying the data voltage to a second node on the basis of the first gate signal;

a fourth transistor connecting the second node to an input terminal for the low level driving voltage on the basis of the second gate signal; and a capacitor connected between the first node and the second node, and wherein a level of a driving current flowing in the light emitting device during an on duty period of the light emitting device is to be constant regardless of a level of the data voltage, wherein one frame comprises a first period and a second period succeeding the first period, wherein during the first period, the first gate signal is to maintain an on level and the second gate signal is to maintain an off level, wherein during the second period, the first gate signal is to maintain an off level and the second gate signal is to maintain an on level, wherein the on duty period of the light emitting device has a length shorter than the second period, and is to vary depending on the level of the data voltage within the second period, wherein the one frame has no more than one on-duty period of the light emitting device, wherein the on duty period of the light emitting device is set based on a discharge speed at which the data voltage of the second node is discharged until a voltage of the capacitor is up to a threshold voltage of the first transistor, wherein the discharge speed for a first data voltage of a first level is faster than the discharge speed for a second data voltage of a second level which is lower than the first level.

11. The display apparatus of claim 10, wherein the first transistor is configured to operate in a linear region in a characteristic curve of a transistor current based on a drain-source voltage, the level of the driving current flowing in the first transistor is to be constant regardless of the level of the data voltage during an on duty period of the first transistor, and the on duty period of the light emitting device corresponds to the on duty period of the first transistor.

12. The display apparatus of claim 11, wherein the on duty period of the first transistor is to vary based on the level of the data voltage, and wherein the on duty period of the light emitting device is to vary based on the level of the data voltage.

13. The display apparatus of claim 12, wherein each of the first to fourth transistors is implemented with a P-type metal oxide semiconductor field effect transistor MOSFET, the level of the data voltage is to vary based on a gray level of an image within a predetermined voltage range, and a level of the predetermined fixing voltage is to be the same as a level of the data voltage which is lowest within the predetermined voltage range.

14. The display apparatus of claim 13, wherein, when the data voltage has a first level, the on duty period of the first transistor has a first value, and when the data voltage has a second level which is higher than the first level, the on duty period of the first transistor has a second value which is greater than the first value.

15. The display apparatus of claim 12, wherein each of the first to fourth transistors is implemented with an N-type metal oxide semiconductor field effect transistor MOSFET, the level of the data voltage is to vary based on a gray level of an image within a predetermined voltage range, and a level of the predetermined fixing voltage is to be the same as a level of the data voltage which is highest within the predetermined voltage range.

16. The display apparatus of claim 15, wherein, when the data voltage has a first level, the on duty period of the first transistor has a first value, and when the data voltage has a second level which is higher than the first level, the on duty period of the first transistor has a second value which is less than the first value.

* * * * *